US008733598B2

(12) United States Patent
Nelson et al.

(10) Patent No.: US 8,733,598 B2
(45) Date of Patent: May 27, 2014

(54) CLOSURE/CONNECTOR FOR LINER-BASED DISPENSE CONTAINERS

(75) Inventors: Gregory C Nelson, Minneapolis, MN (US); Tom Johnson, Star Prairie, WI (US); Richard L Wilson, Edina, MN (US); Michael Elam, Austin, TX (US)

(73) Assignee: Advanced Technology Materials, Inc., Danbury, CT (US)

( * ) Notice: Subject to any disclaimer, the term of this patent is extended or adjusted under 35 U.S.C. 154(b) by 429 days.

(21) Appl. No.: 12/982,160

(22) Filed: Dec. 30, 2010
(Under 37 CFR 1.47)

(65) Prior Publication Data

US 2011/0210148 A1 Sep. 1, 2011

Related U.S. Application Data

(60) Provisional application No. 61/291,258, filed on Dec. 30, 2009, provisional application No. 61/299,237, filed on Jan. 28, 2010, provisional application No. 61/299,427, filed on Jan. 29, 2010, provisional application No. 61/393,583, filed on Oct. 15, 2010.

(51) Int. Cl.
*G01F 11/00* (2006.01)

(52) U.S. Cl.
USPC .......... 222/386.5; 222/1; 222/105; 222/481.5

(58) Field of Classification Search
USPC ......... 222/1, 95, 105, 183, 325, 386.5, 383.1, 222/394, 400.7, 481.5, 553; 53/471; 220/303
See application file for complete search history.

(56) References Cited

U.S. PATENT DOCUMENTS

| | | | | |
|---|---|---|---|---|
| 5,031,801 | A | 7/1991 | Osgar et al. | |
| 5,102,010 | A | 4/1992 | Osgar et al. | |
| 5,158,204 | A * | 10/1992 | Martrich et al. | 220/727 |
| 5,199,609 | A | 4/1993 | Ash, Jr. | |
| 5,213,232 | A * | 5/1993 | Kraft et al. | 221/277 |
| 5,230,447 | A * | 7/1993 | Kirk | 222/505 |
| 5,435,460 | A * | 7/1995 | Osgar | 222/1 |

(Continued)

FOREIGN PATENT DOCUMENTS

| | | |
|---|---|---|
| EP | 1097899 | 5/2001 |
| EP | 2388233 | 11/2011 |

(Continued)

OTHER PUBLICATIONS

U.S. Appl. No. 61,251,430, filed Oct. 14, 2009, Tom et al.

(Continued)

*Primary Examiner* — Frederick C Nicolas
(74) *Attorney, Agent, or Firm* — Winthop & Weinstine, P.A.

(57) ABSTRACT

The present disclosure relates to novel and advantageous closure/connector assemblies for use with a dispense assembly. The closure/connector includes a closure body as well as a cap seat adaptor for operable connection to the closure body. The cap seat adapter has a proximal end and a distal end and is configured for fluid communication with a source of material to be dispensed. The closure/connector also has a cap for connection to the distal end of the cap seat adaptor. A pressurizing gas inlet fitting adapted for connection to a pressure source is also included as a part of the closure/connector. The closure/connector assembly, in conjunction with the dispense assembly, is configured for the secure transport and dispense of the material to be dispensed.

20 Claims, 14 Drawing Sheets

(56) References Cited

U.S. PATENT DOCUMENTS

| | | | | |
|---|---|---|---|---|
| 5,693,017 | A | 12/1997 | Spears et al. | |
| 5,875,921 | A * | 3/1999 | Osgar et al. | 222/1 |
| 5,988,422 | A | 11/1999 | Vallot | |
| 6,015,068 | A * | 1/2000 | Osgar et al. | 222/400.7 |
| 6,206,240 | B1 | 3/2001 | Osgar et al. | |
| 6,453,925 | B1 | 9/2002 | Kamo | |
| 6,460,730 | B1 | 10/2002 | Liedtke | |
| 6,564,973 | B1 * | 5/2003 | Brown et al. | 222/145.1 |
| 6,848,599 | B2 | 2/2005 | Hammarth et al. | |
| 7,021,500 | B1 * | 4/2006 | Finn et al. | 222/145.5 |
| 7,025,234 | B2 | 4/2006 | Priebe et al. | |
| 7,316,329 | B2 * | 1/2008 | Wertenberger | 222/105 |
| 7,735,300 | B2 | 6/2010 | Outreman | |
| 2004/0149348 | A1 * | 8/2004 | Wertenberger | 141/114 |
| 2004/0188449 | A1 | 9/2004 | Thompson | |
| 2009/0020176 | A1 | 1/2009 | Hasegawa et al. | |
| 2009/0057347 | A1 | 3/2009 | Leys et al. | |
| 2010/0112815 | A1 | 5/2010 | O'Dougherty et al. | |
| 2010/0186352 | A1 | 7/2010 | Thomasset et al. | |

FOREIGN PATENT DOCUMENTS

| | | |
|---|---|---|
| JP | 06100087 | 4/1994 |
| JP | 2008007154 | 1/2008 |
| WO | 2005100203 | 10/2005 |
| WO | 2006133026 | 12/2006 |
| WO | 2007061967 | 5/2007 |
| WO | 2007146892 | 12/2007 |
| WO | 2008095024 | 8/2008 |
| WO | 2009076101 | 6/2009 |
| WO | 2011006146 | 1/2011 |
| WO | 2011046802 | 4/2011 |
| WO | 2011085012 | 7/2011 |
| WO | 2012051496 | 5/2012 |

OTHER PUBLICATIONS

U.S. Appl. No. 61/391,945, filed Oct. 11, 2010, Tom et al.

U.S. Appl. No. 61/405,567, filed Oct. 21, 2010, Tom et al.

International Search Report and Written Opinion for related PCT Application PCT/US2012/065515, mailed Feb. 11, 2013 (6 pp.).

* cited by examiner

CLOSURE/CONNECTOR FOR LINER-BASED DISPENSE CONTAINERS

This application claims priority to U.S. Provisional Application No. 61/291,258, filed Dec. 30, 2009; U.S. Provisional Application No. 61/299,237, filed Jan. 28, 2010; U.S. Provisional Application No. 61/299,427, filed Jan. 29, 2010; and U.S. Provisional Application No. 61/393,583, filed Oct. 15, 2010, the contents of all of which are hereby incorporated in their entirety by reference.

FIELD OF THE INVENTION

The present disclosure relates to novel and advantageous storage and dispensing systems. More particularly, the present disclosure relates to novel and advantageous connector assemblies for use with liner-based assemblies, where material may be stored in, shipped in, and dispensed from the liner-based assembly.

BACKGROUND OF THE INVENTION

Numerous manufacturing processes require the use of ultrapure liquids, such as acids, solvents, bases, photoresists, dopants, inorganic, organic, and biological solutions, pharmaceuticals, and radioactive chemicals. Such industries require that the number and size of particles in the ultrapure liquids be controlled to ensure purity. In particular, because ultrapure liquids are used in many aspects of the microelectronic manufacturing process, semiconductor manufacturers have established strict particle concentration specifications for process chemicals and chemical-handling equipment. Such specifications are needed because, should the liquids used during the manufacturing process contain high levels of particles or bubbles, the particles or bubbles may be deposited on solid surfaces of the silicon. This can, in turn, lead to product failure and reduced quality and reliability.

Storage and dispensing systems that are used to store, ship, and dispense the liquids described above, as well as other liquid-based contents, typically include a container of some kind, and/or a liner, a cap that may be used to seal and protect the contents of the storage system when the contents are not being dispensed, and a connector that may be used to dispense the contents from the container. The connector that is used during dispense is typically uniquely configured to provide a particular type of dispense. Accordingly, the connector that is used during dispense will have an effect on several aspects of the dispense, for example, whether the dispense is a pump or pressure dispense, what the rate of flow of dispense may be, and/or how much residue may remain in a liner or container after dispense.

In order to dispense the contents of a container, the sealing cap must be removed and the connector must be attached. Contaminants may be introduced into the system when the system is exposed to the outside environment during the process of removing the cap and attaching the connector.

Further, caps and connectors are often times relatively expensive. Many times, caps and connectors are made to be used repeatedly. Repeated use of caps and/or connectors, however, requires extensive washing and/or sterilizing prior to subsequent uses, which may be time consuming and/or expensive. Additionally, no matter how well a cap and/or connector may be cleaned, there is still the possibility that the cap and/or connector would not be completely cleaned and may thereby introduce contaminants into the contents of a container upon subsequent use. Accordingly, there is a need for a relatively inexpensive cap or closure that may function as both a closure for the system during storage and/or shipping, as well as a connector for use during dispense. There is also a need for a cost-effective combination closure/connector that may be used a single time.

BRIEF SUMMARY OF THE INVENTION

In one embodiment, the present disclosure includes a closure/connector assembly for use with a dispense assembly. The closure/connector includes a closure body as well as a cap seat adaptor for operable connection to the closure body. The cap seat adapter has a proximal end and a distal end and is configured for fluid communication with a source of material to be dispensed. The closure/connector also has a cap for connection to the distal end of the cap seat adaptor. A pressurizing gas inlet fitting adapted for connection to a pressure source is also included as a part of the closure/connector. The closure/connector assembly, in conjunction with the dispense assembly, is configured for the secure transport and dispense of the material to be dispensed.

In another embodiment, the present disclosure relates to a dispense assembly. The dispense assembly includes a liner for holding a material to be dispensed and an overpack that has the liner disposed therein. The dispense assembly further includes a closure/connector assembly secured to the liner and overpack. The closure/connector has a closure body, as well as a cap seat adaptor for operable connection to the closure body. The cap seat adapter has a proximal end and a distal end and is configured for fluid communication with a source of material to be dispensed. The closure/connector also has a cap for connection to the distal end of the cap seat adaptor. A pressurizing gas inlet fitting adapted for connection to a pressure source is included as part of the closure/connector. The closure/connector assembly, in conjunction with the liner and overpack, is configured for the secure transport and dispense of the material to be dispensed.

In another embodiment, the present disclosure relates to a method for storing, shipping, and dispensing the contents of a dispense assembly. The method includes filling the dispense assembly with a desired material. The method further includes securing a closure/connector to the dispense assembly. The closure/connector of the method includes a closure body and a cap seat adaptor for operable connection to the closure body. The cap seat adapter includes a proximal end and a distal end and is configured for fluid communication with a source of material to be dispensed. A cap for connection to the distal end of the cap seat adaptor as well as a pressurizing gas inlet fitting adapted for connection to a pressure source are included as part of the closure/connector. The closure/connector assembly, in conjunction with the dispense assembly, is configured for the secure transport and dispense of the material to be dispensed, such that the material to be dispensed may be dispensed by removing the cap and connecting a liquid dispense outfitting to the distal end of the cap seat adaptor.

BRIEF DESCRIPTION OF THE DRAWINGS

While the specification concludes with claims particularly pointing out and distinctly claiming the subject matter that is regarded as forming the various embodiments of the present disclosure, it is believed that the disclosure will be better understood from the following description taken in conjunction with the accompanying Figures, in which:

DETAILED DESCRIPTION

Figure 1:
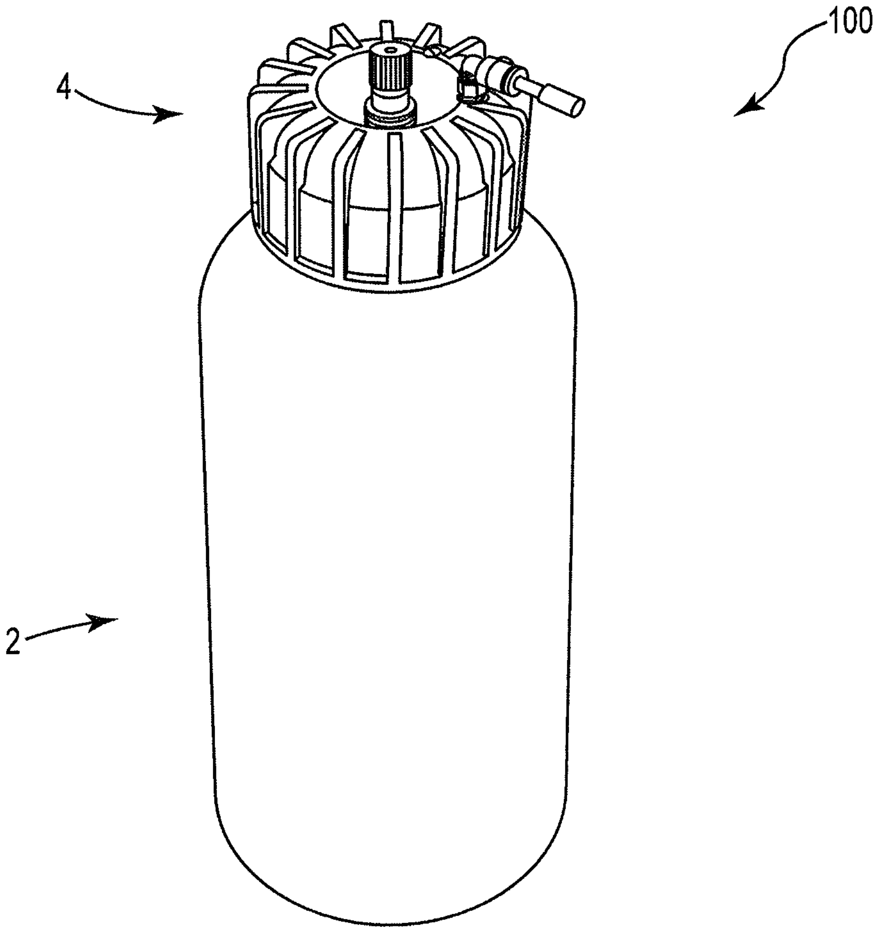
FIG. 1 is a perspective view of a storage and dispensing system, according to one embodiment of the present disclosure.

The present disclosure relates to novel and advantageous storage and dispensing systems. More particularly, the present disclosure relates to novel and advantageous connector assemblies for use with storage devices and methods for using such connectors to store, ship, and/or dispense the contents of a container of the present disclosure.

One aspect of the present disclosure relates to a relatively inexpensive closure/connector that may function both as a cap that may secure a storage and dispensing system during storage and shipping, and as a connector that may allow the contents of a container of the storage and dispensing system to be removed. The closure/connectors of the present disclosure may be used with storage and dispensing containers that may hold up to approximately 200 liters. Alternatively, the dispensing containers may hold up to approximately 20 liters. Alternatively, the dispensing containers may hold approximately 1 to 5 liters. It will be appreciated that the referenced container sizes are examples only and that the closure/connectors of the present disclosure may be readily adapted for use with a wide variety of sized and shaped dispensing containers.

Example uses of storage and dispensing systems of the present disclosure may be, but are not limited to, transporting and dispensing acids, solvents, bases, photoresists, dopants, inorganic, organic, and biological solutions, pharmaceuticals, and radioactive chemicals. However, such liners may further be used in other industries and for transporting and dispensing other products such as, but not limited to, soft drinks, cooking oils, agrochemicals, health and oral hygiene products, and toiletry products, etc. Those skilled in the art will recognize the benefits of such storage and dispense systems and methods of their use, and therefore will recognize the suitability of the closure/connector assembly as used with a storage and dispense system to various industries and for the transportation and dispense of various products.

The closure/connector assembly of the present disclosure may be used a single-time and then disposed of, in some embodiments. Providing a single-time use closure/connector assembly that functions as both the closure cap and the connector during dispense may provide at least two distinct advantages over known covers and connectors for use with dispensing systems. Frequently, the contents of a dispensing system of the type described in the present disclosure are required to be substantially pure, or free from contaminants. In addition, and/or as a consequence of the required purity of the contents, the contents may also be relatively expensive, and in some cases may even be extremely expensive. In dispensing systems that include a closure cap and a separate connector, the contents of the container may be subjected to contaminants when the cap is removed and the connector is fitted onto the container. The closure/connector assembly of the present disclosure can avoid this risk by allowing the closure to also function as the connector.

FIG. 1 illustrates a perspective view of one embodiment of a storage and dispensing system 100 of the present disclosure. Storage and dispensing system 100 may generally include a bottle or container 2 and a closure/connector assembly 4.

Figure 2:
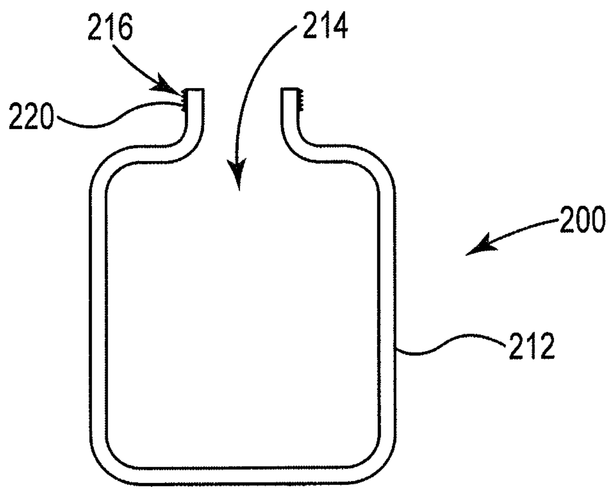
FIG. 2 is a cut-away view of a container of the present disclosure, according to one embodiment.

As shown in FIG. 2, in one embodiment, the container 200 may include a container wall 212, an interior cavity 214, and a mouth 216. The outside of the mouth 216 of the container 200 may have threads 220 that may couple with complementary threads on a closure/connector assembly (discussed more fully below). It will be appreciated that the mouth 216 of the container may alternatively or additionally have any other means for coupling to a closure/connector such as a snap-fit mechanism or any other suitable mechanism or combination of mechanisms for coupling. The container 200 may be plastic, glass, metal, or any other suitable material or combination of materials. The container may be of any suitable shape or configuration, such as, but not limited to, a bottle, a can, a drum, etc. For instance, by way of example and not limitation, in one embodiment the container 200 may be a glass bottle. In another embodiment, the container 200 may be what is typically referred to as a metal can. The container 200 may be manufactured using any process, such as injection blow molding, injection stretch blow molding, extrusion, etc. The container 200 may be manufactured as a single component or may be a combination of multiple components. In some embodiments, the container 200 may have a relatively simplistic design with a generally smooth container wall 212 and interior cavity 214. In other embodiments, the container 200 may have a relatively complicated design including, for example and not limited to, indentations, protrusions, and/or varying wall 212 thickness. Such a container may be substantially similar to the containers disclosed in U.S. Application No. 61/251,430, entitled, "Material Storage and Dispensing System and Method With Degassing Assembly," filed Oct. 14, 2009, now International PCT Patent Application No. PCT/US10/51786, filed Oct. 7, 2010, each of which is hereby incorporated herein by reference in its entirety. Similarly, International PCT Patent Application No. PCT/US10/41629, titled "Substantially Rigid Collapsible Liner and Flexible Gusseted or Non-Gusseted Liners and Methods of Manufacturing the Same and Methods for Limiting Choke-Off in Liners," filed on Jul. 9, 2010; U.S. Patent Appl. No. 61/391,945, titled "Substantially Rigid Collapsible Liner, Container and/or Liner for Replacing Glass Bottles, and Flexible Gusseted or Non-Gusseted Liners," filed Oct. 11, 2010; U.S. Patent Appl. No. 61/405,567, titled "Substantially Rigid Collapsible Liner, Container and/or Liner for Replacing Glass Bottles, and Flexible Gusseted or Non-Gusseted Liners," filed Oct. 21, 2010; and U.S. patent application Ser. No. 11/915,996, titled "Fluid Storage and Dispensing Systems and Processes," which was filed Jun. 5, 2006, all of which are hereby incorporated herein by reference in their entirety, also disclose containers that may be used in accordance with the present disclosure.

Figure 3:
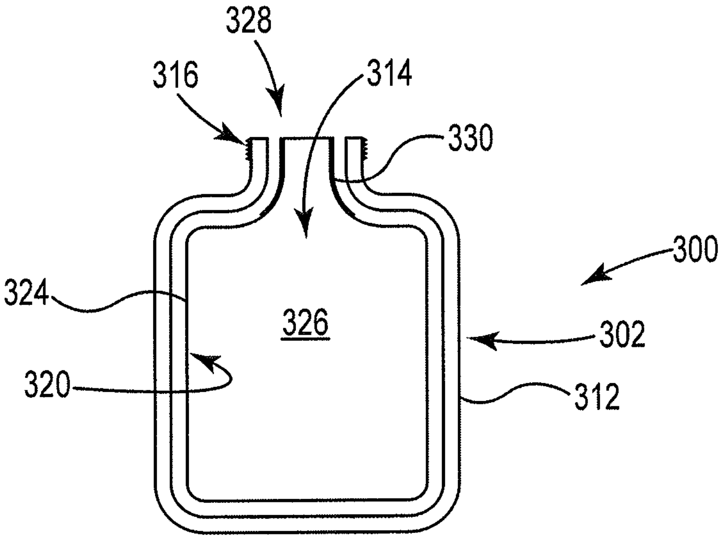
FIG. 3 is a cut-away view of a container system, including a container and liner, according to one embodiment of the present disclosure.

As shown in FIG. 3, a container may comprise a container system 300 that may include, in some embodiments, a container or overpack 302 and a liner 320. The overpack 302 may have an overpack wall 312 and a mouth 316, similar to the container described above and shown in FIG. 2. Also similar to the container described above, the overpack 302 may be plastic, glass, metal, or any other suitable material or combination of materials. The overpack may be of any suitable shape or configuration, such as, but not limited to, a bottle, a can, a drum, etc. The liner 320 may include a liner wall 324, an interior cavity 326, and a mouth 328. The liner 320, in one embodiment, may be dimensioned and shaped to substantially conform to the interior of the container or overpack 302. As such, the liner 320 may have a relatively simplistic design with a generally smooth outer surface, or the liner 320 may have a relatively complicated design including, for example but not limited to, indentations and protrusions. The liner 320 may have a relatively thin liner wall 324, as compared to the thickness of the overpack wall 312. In one embodiment, the liner 320 may be flexible such that the liner wall 324 may be readily collapsed, such as by vacuum through the mouth 328 or by pressure between the liner wall 324 and overpack wall 312.

The liner 320, in a further embodiment, may have a shape, when inflated or filled, that is different from, but complimentary with, the shape of the overpack 302 such that it may be disposed therein. In some embodiments, the liner 320 may be removably attached to the interior of the overpack wall 312. The liner 320 may provide a barrier, such as a gas barrier, against drive gas migration from the space between the liner wall 324 and the overpack wall 312. In some embodiments, the liner 320 may be manufactured using one or more polymers, including plastics, nylons, EVOH, polyolefins, or other natural or synthetic polymers. In a further embodiment, the liner 320 may be manufactured using a fluoropolymer, such as but not limited to, polychlorotrifluoroethylene (PCTFE), polytetrafluoroethylene (PTFE), fluorinated ethylene propylene (FEP), perfluoroalkoxy (PFA), polyethylene terephthalate (PET), polyethylene naphthalate (PEN), poly(butylene 2,6-naphthalate) (PBN), polyethylene (PE), linear low-density polyethylene (LLDPE), low-density polyethylene (LDPE), medium-density polyethylene (MDPE), high-density polyethylene (HDPE), and/or polypropylene (PP). In some embodiments, the liner 320 may comprise multiple layers. The multiple layers may comprise one or more different polymers or other suitable materials. The mouth 328 of the liner 320 may also have a fitment portion 330. The fitment portion 330 may be made of a different material than the rest of the liner 320 and may be harder, more resilient, and/or less flexible than the rest of the liner 320. PCT Application No. PCT/US208/085264, entitled, "Blow Molded Liner for Overpack Container and Method of Manufacturing the Same," filed Dec. 2, 2008, and International PCT Patent Application No. PCT/US10/41629, titled "Substantially Rigid Collapsible Liner and Flexible Gusseted or Non-Gusseted Liners and Methods of Manufacturing the Same and Methods for Limiting Choke-Off in Liners," filed on Jul. 9, 2010, all disclose liners that may be used in accordance with the present disclosure and are all hereby incorporated herein by reference in their entirety. Similarly, U.S. Patent Appl. No. 61/391,945, titled "Substantially Rigid Collapsible Liner, Container and/or Liner for Replacing Glass Bottles, and Flexible Gusseted or Non-Gusseted Liners," filed Oct. 11, 2010; U.S. Patent Appl. No. 61/405,567, titled "Substantially Rigid Collapsible Liner, Container and/or Liner for Replacing Glass Bottles, and Flexible Gusseted or Non-Gusseted Liners," filed Oct. 21, 2010; and U.S. patent application Ser. No. 11/915,996, titled "Fluid Storage and Dispensing Systems and Processes," which was filed Jun. 5, 2006, all of which are hereby incorporated herein by reference in their entirety, also disclose liners that may be used in accordance with the present disclosure.

Figure 4:
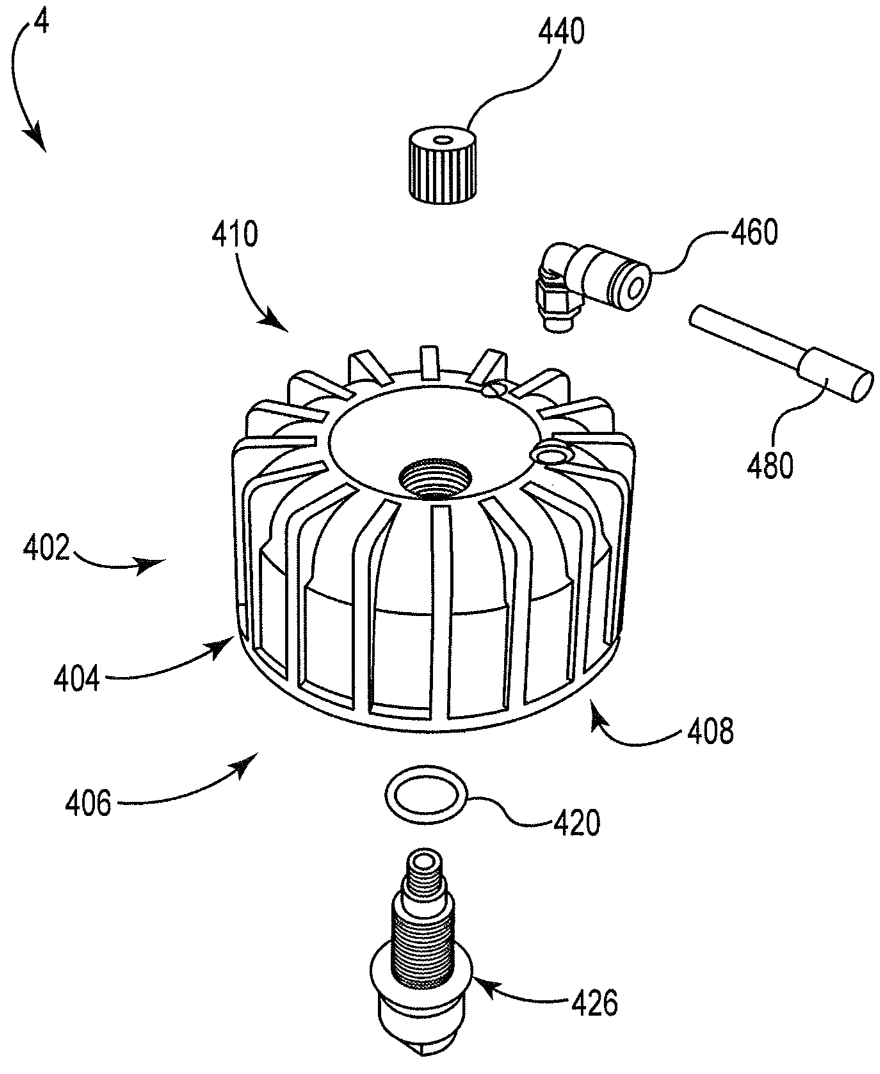
FIG. 4 is a perspective view illustrating the parts of a closure/connector assembly, according to one embodiment of the present disclosure.

The closure/connector assembly 4 of the present disclosure may include a number of separate or integral components. As shown in FIG. 4, in one embodiment, the closure/connector assembly 4 may include a closure body 402, a gas seal O-ring 420, a cap seat adaptor 426, a locking cap 440, such as a luer locking cap or a cap having other suitable connection means, as will be described further below, a pressurizing gas inlet fitting 460, and a gas fitting plug 480.

The closure body 402 may have an exterior 404 and an interior 408 and may have a proximal end 406 and a distal end 410. The proximal end 406 may generally be the end of the closure body 402 that may be coupled to a container and/or liner. The distal end 410 may generally be the end of the closure body 402 that may couple to a means for filling the container, and/or dispensing the contents of the container, and/or sealing the system from outside contaminants.

Figure 5:
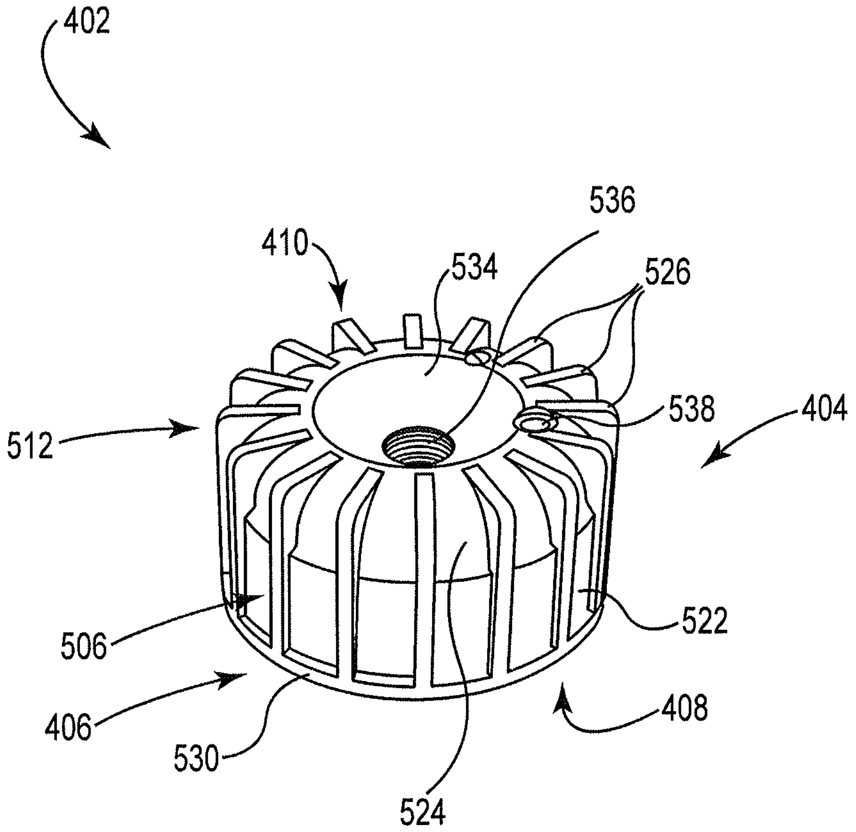
FIG. 5 is a perspective view further illustrating the closure body of a closure/connector assembly, according to one embodiment of the present disclosure.

As shown in FIG. 5, in one embodiment, the closure body exterior 404 may include a base section 506, a ribbed section 512, a center indentation 534, an adaptor coupling opening 536, and a gas inlet coupling opening 538. However, it is recognized that not all of these components are required for every embodiment, and some elements may be eliminated from some embodiments while still further elements may be added to other embodiments.

The base section 506 may be generally circular in one embodiment. The base section may include an outer rim 522 with substantially straight sides and an angled rim 524 that may be distal to the outer rim 522, wherein the sides of the angled rim 524 angle or curve in toward the center of the closure body 402. The angled rim 524 may have sides that have any degree of angle or curvature toward the center of the closure body 402, including in one embodiment, zero degree of angle. The closure body exterior 404 may also have a ribbed section 512 comprised of a plurality of ribs 526 that generally protrude from the base section 406. A rib rim 530 may extend around the entirety of the closure body exterior 404 and may be proximal to the outer rim 522. The rib rim 530 may protrude further from the closure body exterior 404 than the outer rim 522 and/or the angled rim 524. The plurality of ribs 526 may extend from the rib rim 530 to the distal end 410 of the closure body exterior 404. The rib section 512 may provide a gripping section to allow a user or machine to more easily couple and/or uncouple the closure body 402 from a container. In other embodiments the closure body may have any other suitable geometry, such as hexagonal, square, or any other shape.

The closure body exterior 404 may, in one embodiment, also include a center indentation 534 at the distal end 410 of the closure body 402, such that the center indentation 534 forms a depression toward the interior of the closure body 402. The center indentation 534 may be depressed any suitable degree. In one embodiment, the center indentation 534 may be depressed at least enough so that the cap connector portion of the cap seat adaptor 426 (described in detail below) does not extend above the distal end 410 of the closure body exterior 404. At the center of the center indentation 534 may be an adaptor coupling opening 536. A gas inlet coupling opening 538 may also be provided at the distal end 410 of the closure body exterior 404. The gas inlet coupling opening 538 may be generally positioned at the interface between the distal end 410 of the angled rim 524 and the center indentation 534. It will be recognized, however, that the gas inlet coupling opening 538 may be positioned at any suitable location on the closure body exterior 404.

Figure 6:
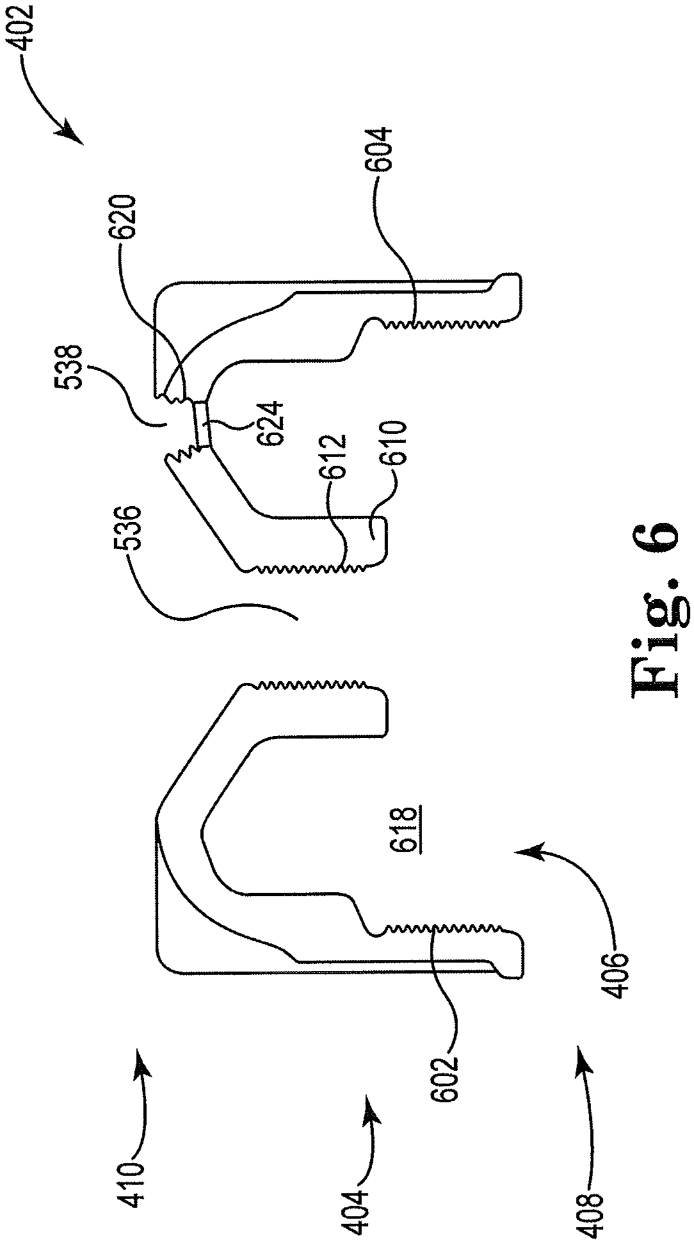
FIG. 6 is a cut-away view of the closure body of FIG. 5, according to one embodiment of the present disclosure.

As shown in FIG. 6, the interior 406 of the closure body 402 may include an outer connector portion 602, an inner connector portion 610, a gas inlet connector portion 620, and an interior cavity 618. As illustrated, in one embodiment, the outer connector portion 602 may extend around the entire outer perimeter of the interior 406 of the closure body 402. The outer connector portion 602 may have any thickness suitable for maintaining mechanical integrity, for example, from about ⅛ of an inch to about ¾ of an inch, or any suitable greater or lesser thickness. The interior side of the outer connector portion 602 may comprise threads that couple to complimentary threads on the mouth 316 (FIG. 3) of a container and/or liner. It will be recognized that any alternative or additional coupling means may be employed to couple the closure body 402 to the container of the present disclosure, such as, for example, a snap fitting mechanism. As illustrated, in one embodiment, the inner connector portion 610 may extend around the entire inner perimeter of the interior 406 of the closure body 402. Further, the inner connector portion 610 may extend down from the adaptor coupling opening 536. In one embodiment, the inner connector portion 610 may not extend as far in the proximal direction as the outer connector portion 610. The inner connector portion 610 may have any desired thickness, for example, from about ⅛ of an inch to about ¾ of an inch, or any suitable greater or lesser thickness. The interior side of the inner connector portion 610 may comprise threads 612 that may couple to complimentary threads on the cap seat adaptor 426 (described further below). It will be recognized that any alternative or additional coupling structures or mechanisms may be employed to couple the inner connector portion 610 to the cap seat adaptor 426 such as, for example, a snap fitting mechanism.

The closure body interior 406 may also include a gas inlet connector portion 620 corresponding to the gas inlet coupling opening 538 as seen on the closure body exterior 404. The gas inlet connector portion 620 may comprise threads that couple to complimentary threads on the pressurizing gas inlet fitting 460 (described more fully below). However, it will be recognized that any alternative or additional coupling structures or mechanisms may be employed to couple the gas inlet portion 620 to the pressurizing gas inlet fitting 460 such as, for example, a snap fitting mechanism. The closure body interior 406 may also have an interior cavity 618 for receiving the mouth of a container and/or liner. The gas inlet connector portion 620 may also include a tube opening 624 that generally permits a gas pressure in-line (described more fully below) to be inserted through the closure body 406 and into the interior cavity 618 of the closure body 406. In embodiments of the disclosure that use pump-dispense to discharge the contents of the container, the gas inlet connector portion 620 or gas inlet fitting may function as a vent, and accordingly may not need to be connected to a gas pressure in-line.

The closure body 402 may be comprised of any suitable material such as plastic, metal, glass, or any other suitable material, or combination of materials. In one embodiment, the closure body 402 may be comprised of polypropylene. The closure body 402 may be formed by any suitable means such as injection molding and/or machining, for instance.

The closure/connector assembly 4 of the present disclosure, in one embodiment, may also include a gas seal O-ring 420 (FIG. 4) that may create a seal between the interface of the inner connector portion 610 and the connector portion of the cap seat adaptor 426 (described more fully below). The gas seal O-ring 420 may be comprised of an elastomer, for instance EPDM (ethylene propylene diene M-class) rubber, or any other suitable material. Conventional O-rings are well known and may be purchased for use with the system of the present disclosure.

Figure 7A:
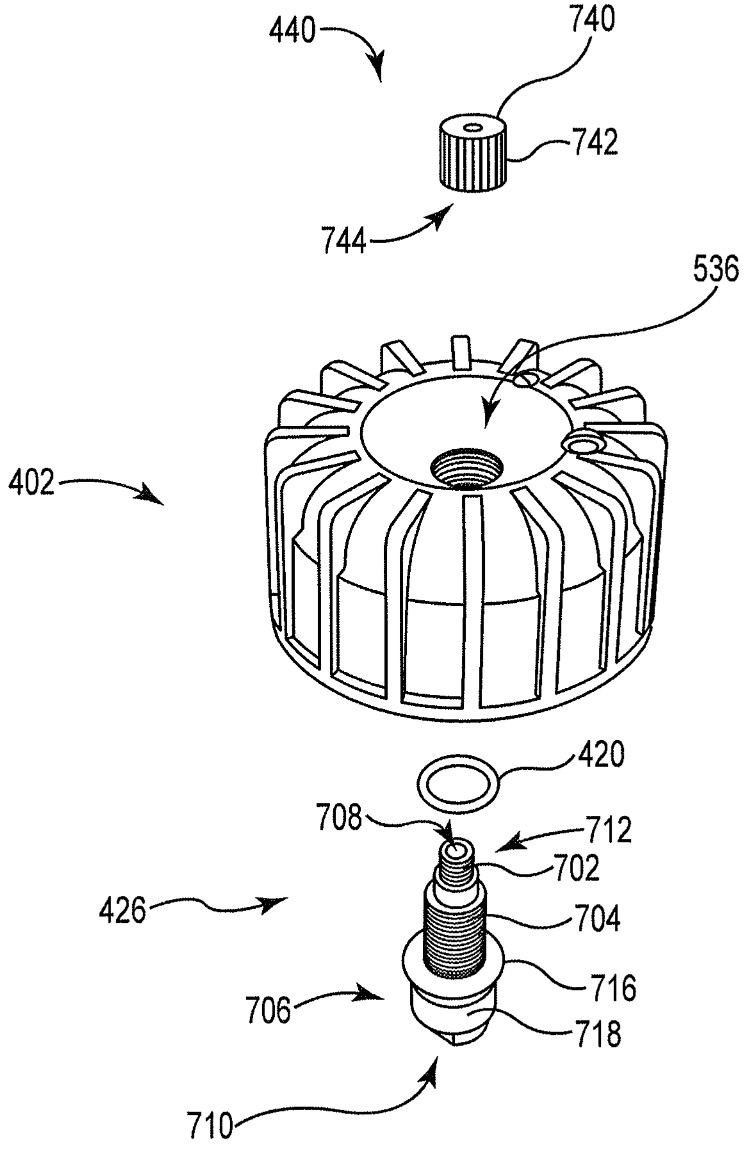
FIG. 7*a* is a perspective view showing the closure body, cap seat adaptor, and locking cap of the present disclosure, according to one embodiment of the present disclosure.

As shown in FIG. 7*a*, the cap seat adaptor 426 of the closure/connector assembly 4 may, in one embodiment, comprise a connector portion 702, such as a quick connect (e.g., a luer connection portion) or a connector having other suitable connection means portion, a cap connector portion 704, a base 706, and an opening 708. The cap seat adaptor 426 may have a proximal end 710 and a distal end 712. The quick-connect or luer connector portion 702 and the cap connector portion 704 may generally comprise a tubular body. The luer connector portion 702 may be positioned distally of the cap connector portion 704. The luer connector portion 702 of the cap seat adaptor 426 may be substantially circular with a circumference that allows the luer connector portion 702 to pass through the adaptor coupling opening 536 of the closure body 402. The luer connector portion 702 may comprise threads or other connection means that may couple with complimentary threads or connection means on the luer locking cap 440 (discussed in further detail below). While discussed generally herein as using a luer connection, it is recognized that other suitable coupling or connection means may be employed alternatively or in addition to the luer connection such as, but not limited to, a snap fit connection, a push-fit connection, any type of threaded connection, a compression connection, a flare connection, any type of insert connection, a barb connection, any type of quick-connect connection, or any other suitable connection means of combinations thereof. Accordingly, a connector portion 702 employing any of the connection means described above are considered within the spirit and scope of the present disclosure, and the various embodiments of the present disclosure are not to be limited to only luer connections.

The cap connector portion 704 of the cap seat adaptor 426 may be longer and have a larger circumference than the luer connector portion 702. The cap connector portion 704 may comprise threads on the outside of its tubular body, such that the threads may couple with complimentary threads on the inner connector portion 610 of the closure body 402. It will be recognized that any alternative or additional coupling means may be employed to couple the cap connector portion 704 of the cap seat adaptor 426 with the inner connector portion 610 of the closure body 402, such as, for example, a snap fitting mechanism.

The base 706 of the cap seat adaptor 426 may be positioned proximal to the cap connector portion 704. The base 706 may comprise a wider shoulder section 716 that may be distal to a narrower section 718. An opening 708 may run through the entire length of the cap seat adaptor 426 such that a liquid and/or a gas may pass through the length of the cap seat adaptor 426. The cap seat adaptor 426 may be formed of any suitable material, such as plastic, metal, glass, or any other suitable material, or combination of materials. For example, the cap seat adaptor 426 in one embodiment may be comprised of PTFE (polytetrafluoroethylene).

Figure 7B:
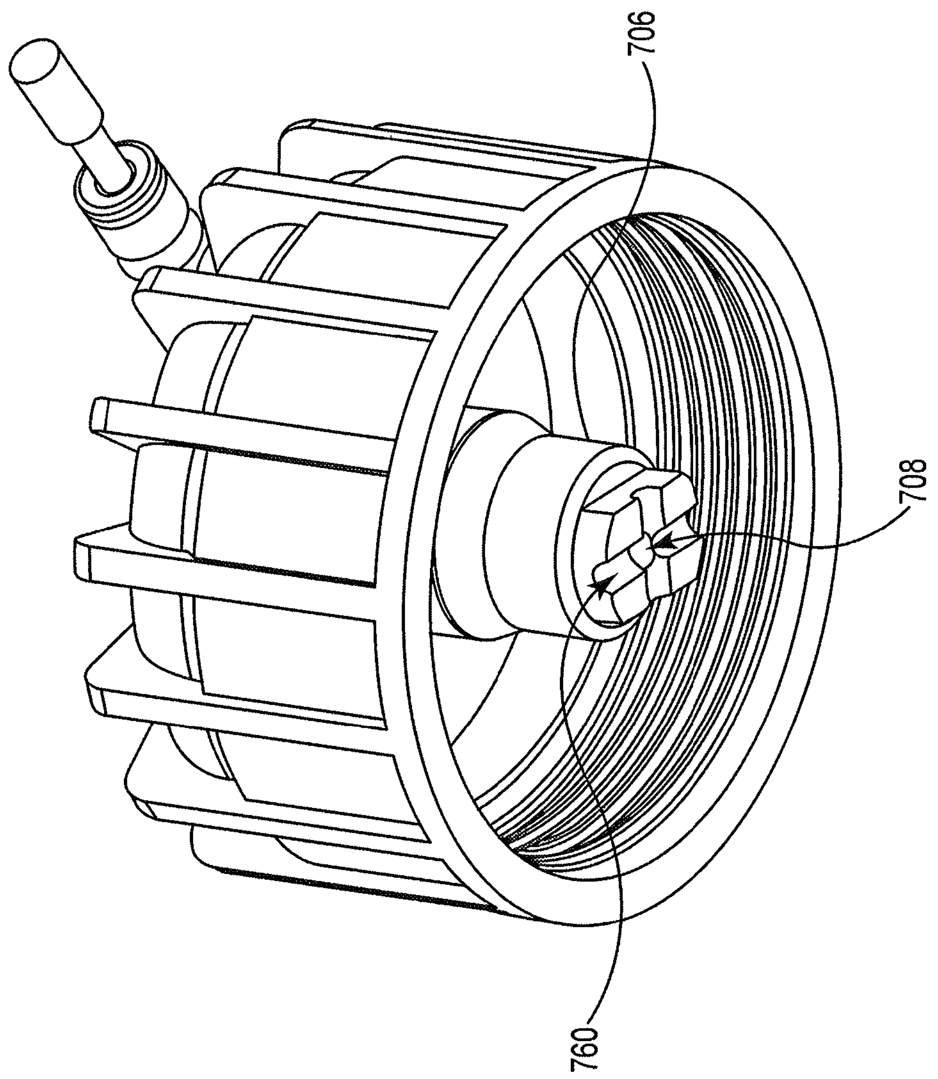
FIG. 7*b* shows a bottom view of a cap seat adaptor of the present disclosure, according to one embodiment.

The cap seat adaptor 426, in some embodiments, may also have one or more features to help reduce or prevent choke-off. For example, but not limited to, the interior side of the base 706 of the cap seat adaptor 426, in one embodiment, may have a cross-shaped cut-out as shown in FIG. 7*b*, which shows a bottom view of a cap seat adaptor 426. As discussed above, the opening 708 may extend the entire length of the cap seat adaptor 426. The cross-shaped channels 760 may not extend the entire length of the cap seat adaptor 426, but rather may extend only a small distance distally into the base 706 of the cap seat adaptor. For example, the channels 760 may extend into the base 706 approximately from about ⅛ of an inch to about an inch, or any other suitable distance into the base 706 of the cap seat adaptor 426. The channels 760 along with the opening 708 may help reduce or prevent chock-off as the contents of the liner are dispensed. Generally speaking, choke-off may be described as what occurs when a liner ultimately collapses on itself, or a structure internal to the liner, to form a choke point disposed above a substantial amount of liquid. When choke-off occurs, it may preclude complete utilization of the liquid disposed within the liner, which can be a significant problem, as specialty chemical reagents utilized in industrial processes such as the manufacture of microelectronic device products can be expensive. A variety of ways of preventing or handling choke-off are described in PCT Application Number PCT/US08/52506, entitled, "Prevention Of Liner Choke-off In Liner-based Pressure Dispensation System," with an international filing date of Jan. 30, 2008, which is hereby incorporated herein by reference in its entirety. Additional ways of preventing or handling choke-off are described in International PCT Patent Application No. PCT/US10/41629, titled "Substantially Rigid Collapsible Liner and Flexible Gusseted or Non-Gusseted Liners and Methods of Manufacturing the Same and Methods for Limiting Choke-Off in Liners," filed on Jul. 9, 2010, which was previously incorporated herein by reference in its entirety.

Figure 7C:
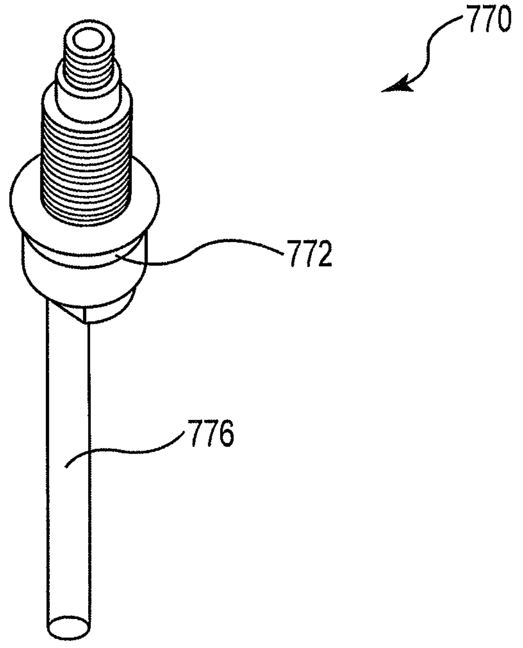
FIG. 7*c* is a perspective view showing another embodiment of a cap seat adaptor of the present disclosure.

In another embodiment of the cap seat adaptor 770, shown in FIG. 7*c*, a dip tube 776 may be coupled to the base 772 of the cap seat adaptor 770. The dip tube 776 may be inserted into the interior of the container or liner. The dip tube 776 may extend any distance into the container or liner, such as ½ the distance into the container, or the dip tube 776 may extend less than or more than ½ the distance into the container. The dip tube may be made of plastic, rubber, glass, or any other suitable material, or combination of materials. In other embodiments, for example but not limited to those for use with pressure dispense applications, the dip tube 776 may extend only a relatively short distance into the liner, which in some cases may be referred to as a "stubby probe." Examples of "stubby probes" that may be used with the present disclosure may be those of ATMI of Danbury, Conn., or those disclosed in PCT Application No. PCT/US07/70911, entitled "Liquid Dispensing Systems Encompassing Gas," with an international filing date of Jun. 11, 2007, which is hereby incorporated by reference herein in its entirety.

The closure/connector assembly 4 of the present disclosure may also include, in one embodiment, a locking cap 440, such as a luer locking cap, as shown in FIG. 7*a*. The luer locking cap 440 may include an exterior portion 740 and a stem portion 744. The exterior portion 740 may have a plurality of ribs 742 positioned vertically about the outside perimeter of the luer locking cap 440. The ribs 742 may provide traction to allow a user or machine to more easily and securely couple or decouple the luer locking cap 440 to the cap seat adaptor 426. As described above, while discussed generally herein as using a luer connection, it is recognized that other suitable coupling or connection means may be employed alternatively or in addition to the luer connection such as, but not limited to, a snap fit connecting, a push-fit connection, any type of threaded connection, a compression connection, a flare connection, any type of insert connection, a barb connection, any type of quick-connect connection, or any other suitable connection means or combinations thereof. Accordingly, a locking cap 440 employing any of the connection means described above are considered within the spirit and scope of the present disclosure, and the various embodiments of the present disclosure are not to be limited to only luer connections.

Figure 9:
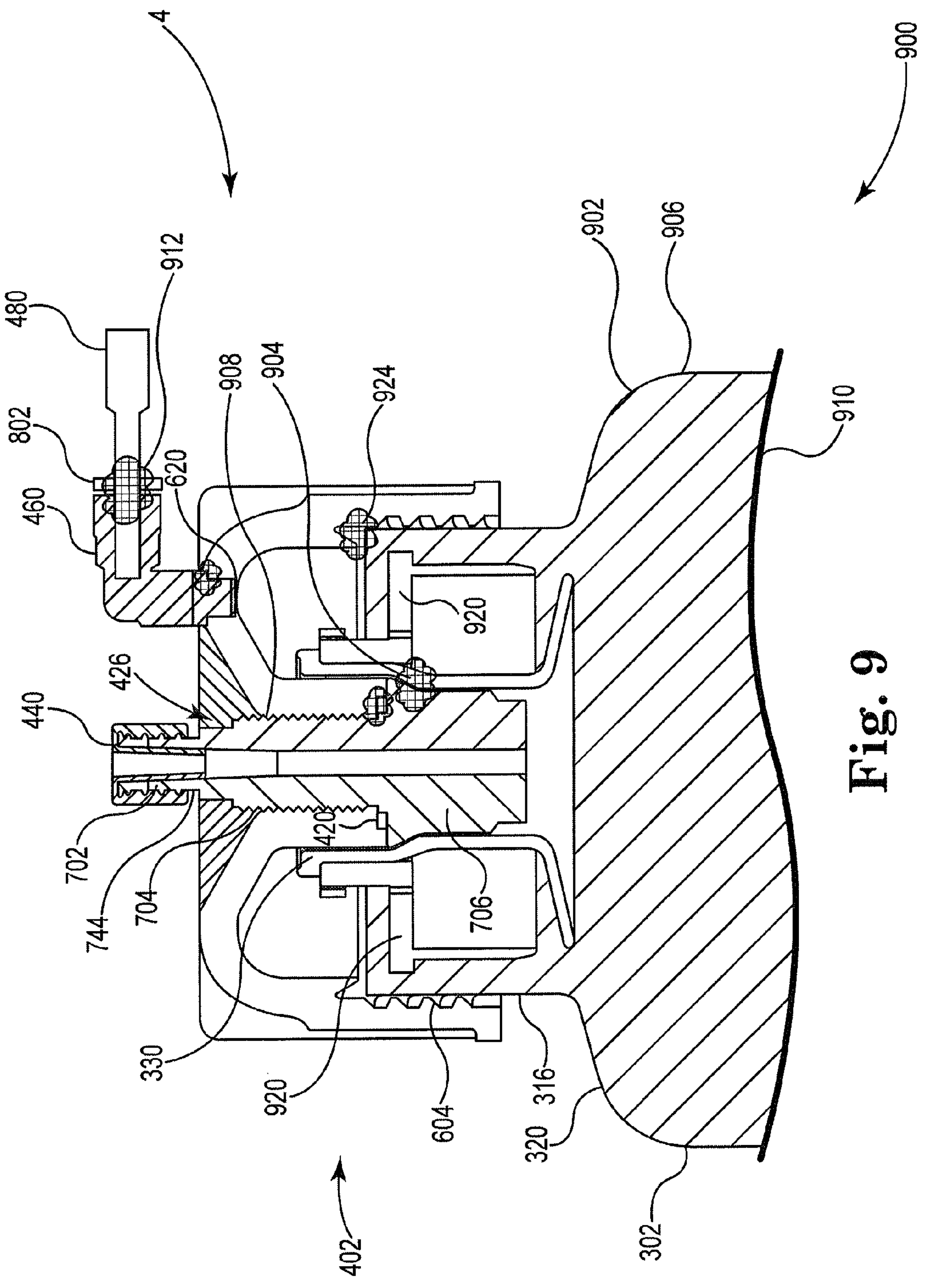
FIG. 9 shows a cut-away view of system of the present disclosure, according to one embodiment.

As is further illustrated in FIG. 9, the interior of the luer locking cap 440 may comprise threads or other connection means that may couple with complimentary threads or connection means on the luer connector portion 702 of the cap seat adaptor 426. The interior portion of the luer locking cap 440 may also include a stem portion 744 that is sized and shaped to fit generally snugly inside of the opening 708 of the cap seat adaptor 426. The luer locking cap 440 may be comprised of plastic, metal, or any suitable material, or combination of materials. In one embodiment, the luer locking cap 440 may be comprised of polypropylene.

Figure 8:
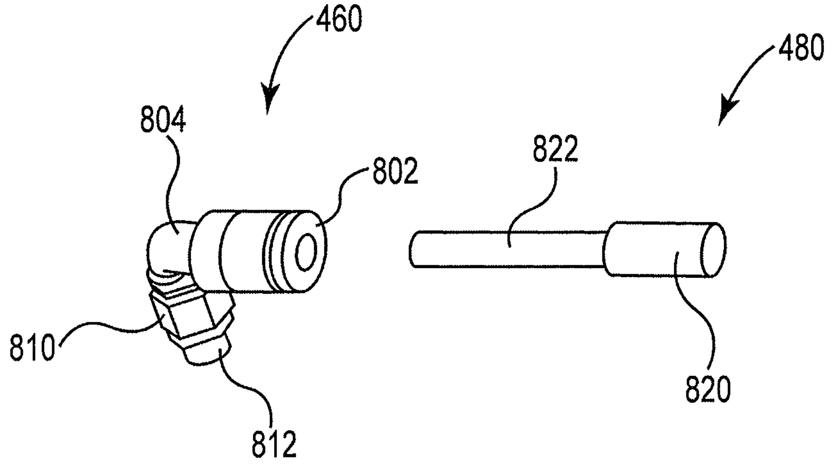
FIG. 8 is a perspective view further illustrating a pressurizing gas inlet fitting and gas fitting tube of the closure/connector assembly, according to one embodiment of the present disclosure.

The closure/connector assembly 4 may also comprise a pressurizing gas inlet fitting 460. As shown in FIG. 8, in one embodiment, the pressurizing gas inlet fitting 460 may be generally elbow-shaped. The gas inlet fitting 460 may comprise a connector 812, a screw 810, a joint section 804, and a receiving end 802. The connector 812 may have threads that couple to complementary threads on the gas inlet connector portion 620 of the closure body 402. It will be recognized that various alternative or additional coupling means may be employed to couple the connector 812 of the gas inlet fitting 460 with the gas inlet connector portion 620 of the closure body 402 such as, for example, a snap fitting mechanism. The screw 810 of the gas inlet fitting 460 may couple the connector 812 to one end of the joint section 804. It will be appreciated that various other suitable connectors may be used such as a hex joint, a nut, etc. In still other embodiments, one or more components of the pressurizing gas inlet fitting, such as the connector 812 and joint section 804, may be integral with one another. The other end of the joint section 804 may comprise a receiving end 802. The receiving end 802 may detachably couple to a gas fitting plug 480 and/or a gas inlet tube (described more fully below). The gas inlet fitting 460 may be comprised of plastic, metal, rubber, or any other suitable material, or combination of materials. The gas inlet fitting 460, such as those described in the embodiments of the present disclosure are generally known and may be purchased; for example, the KJ series from SMC Pneumatics may be used with embodiments of the present disclosure.

As shown in FIG. 8, a gas fitting plug 480 may generally be cylindrically-shaped. The gas fitting plug 480 may comprise a handle portion 820 and an insertion portion 822. The handle portion 820 may have a greater circumference than the insertion portion 822. The insertion portion 822 may have a circumference that permits it to be securely coupled to the receiving end 802 of the gas inlet fitting 460 when the insertion portion is fitted inside of the receiving end 802. The gas fitting plug 480 may be comprised of plastic, rubber, or any other suitable material or combination of materials. Gas fitting plugs 480, such as those described in the present disclosure are generally known and may be purchased; for example, the KQ2 series from SMC may be used with embodiments of the present disclosure.

FIG. 9 shows one embodiment of the system of the present disclosure 900 in a storage state or empty state, wherein the closure/connector assembly may be fully assembled and coupled to a container. In such a state, the closure/connector assembly 4 may function as a substantially leak-proof, contamination-proof cap or closure. A support piece 920 may be detachably positioned in the mouth 316 of the overpack 302. The support piece 920 may help hold the fitment 330 of the liner in place. The support piece 920, in another embodiment, may comprise a portion of the fitment 330 of the liner 320, and accordingly may be integral with the liner 320. A seal 924 may be positioned on the distal surface of the support piece 920, as may be seen in FIG. 9. The surface of the seal 924 and the horizontal surface of the support piece 920 may have a plurality of holes such that air or gas may pass from the interior cavity of the closure body 402, into the area between the wall of the container 302 and the wall of the liner 320.

As can be seen, the gas seal O-ring 420 may be placed on the cap seat adaptor 426, such that the O-ring 420 may generally be positioned at the interface between the shoulder portion 716 of the cap seat adaptor 426 and the cap connector portion 704 of the cap seat adaptor 426. The threads of the cap connector portion 704 of the cap seat adaptor 426 may be coupled to the threads of the inner connector portion 610 of the closure body 402, such that the O-ring 420 provides a substantially air-tight seal 902 between the cap seat adaptor 426 and the inner connector portion 610 of the closure body 402. In addition, the connection between the cap connector portion 704 of the cap seat adaptor 426 and the inner connector portion 610 of the closure body 402 may also provide a seal between the cap seat adaptor 426 and the closure body 402. As shown in FIG. 9, in one embodiment where the container comprises an overpack 302 and a liner 320, the fitment 330 of the liner 320 may be configured to receive and secure the base 706 of the cap seat adaptor 426. A substantially air-tight fitment seal may be formed between the base 706 of the cap seat adaptor 426 and the fitment 330 of the liner 320, such as illustrated by region 904. Accordingly, the cap seat adapter can provide a passage for the flow of contents from the liner.

Still referring to FIG. 9, the threads 604 on the outer connector portion 602 of the closure body 402 may then be coupled to complementary threads on the mouth 316 of the container or overpack 302. A substantially air tight ridge seal may be formed between the container 2 and the closure body 402, as illustrated in region 906. The luer locking cap 440 may then be coupled to the luer connector portion 702 of the cap seat adaptor 426. A substantially air-tight seal may be formed between the luer locking cap 440 and the luer connector portion 702 of the cap seat adaptor 426. As may be seen, in some embodiments, the luer locking cap 440 may protrude above the closure body 402. The pressurizing gas inlet fitting 460 may be coupled to the gas inlet connector portion 620 of the closure body 402. A substantially air-tight gasket seal may be formed between the gas inlet fitting 460 and the gas inlet connector portion 620 of the closure body 402. The gas fitting plug 480 may be inserted into the receiving end 802 of the gas inlet connector portion 620. A substantially air-tight fitting seal may be formed between the gas fitting plug 480 and the receiving end 802 of the gas inlet connector portion 620 as illustrated in region 912. Assembled accordingly, the system 900 of the present disclosure may store the contents of the container system, keeping the contents substantially free of contaminants.

Figure 10A:
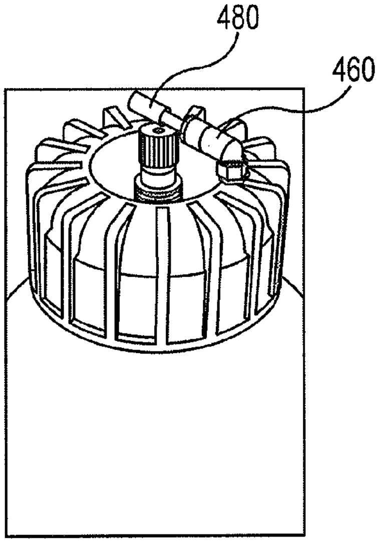
FIGS. 10*a*-10*c* are perspective views showing the steps for shipping the system of the present disclosure, according to one embodiment.
Figure 10B:
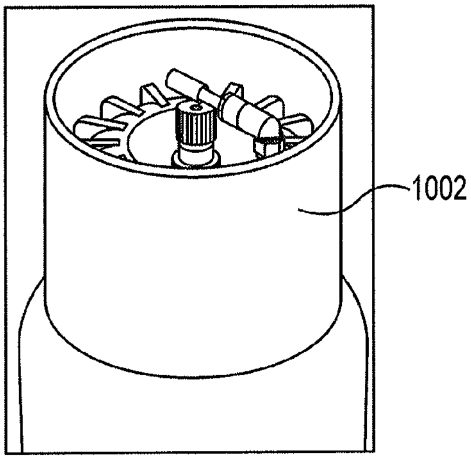
Figure 10C:
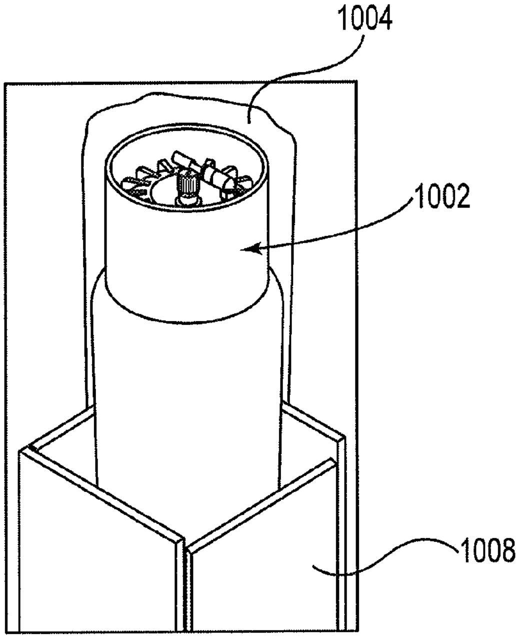

In one embodiment, the system of the present disclosure may also be configured in a shipping state, as may be seen in FIGS. 10*a*-10*c*. As shown in FIG. 10*a*, the pressurizing gas inlet fitting 460, with the gas fitting plug 480 attached, may be rotated toward the center of the closure/connector assembly, such that they may be protected from breakage or other damage during shipment and/or storage. A shipping ring 1002, as shown in FIG. 10*b*, may be placed over the closure/connector assembly to protect the assembly from damage and/or leaks during shipping and/or storage. The shipping ring 1002 may extend above the closure/connector assembly and may be comprised of metal, plastic, or any other suitable material, or combination of materials. As shown in FIG. 10*c*, in some embodiments, the assembly of FIG. 10*b* may then be placed in a standard clean-room bag and/or placed in a suitable shipping box 1008. The shipping box may then be sealed.

Figure 11A:
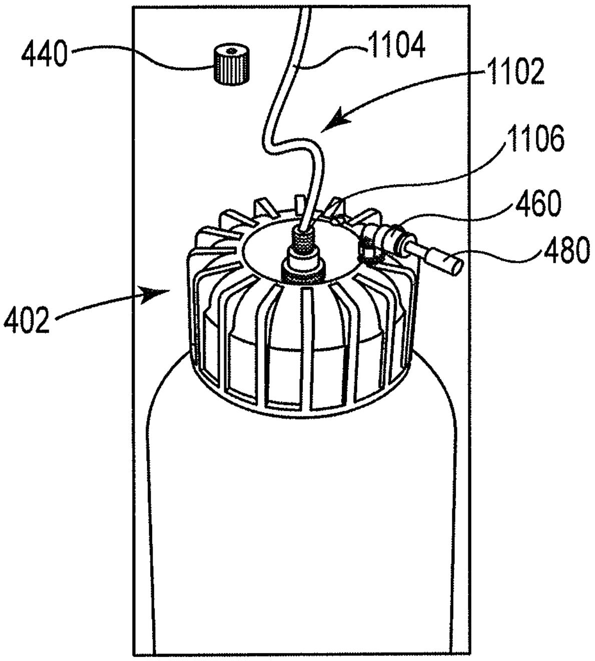
FIGS. 11*a*-11*b* are perspective views showing the steps for dispensing the contents of the system of the present disclosure, according to one embodiment.
Figure 11B:
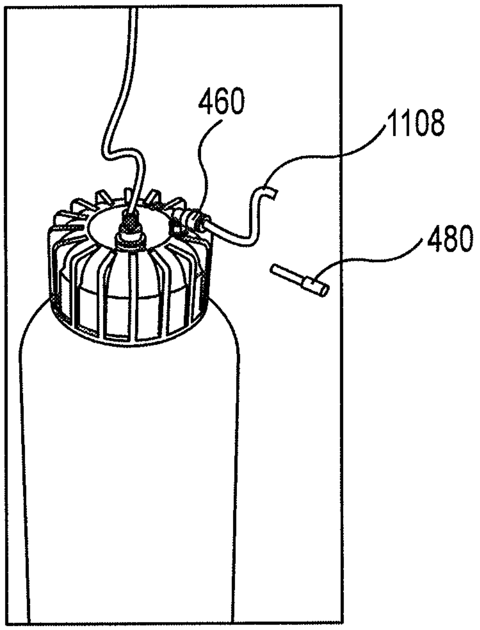

As can be seen in FIGS. 11*a* and 11*b*, the closure/connector assembly 402 may function as a dispense connector when the system is in a dispensing state. To convert the system from the storage state to the dispensing state, the luer locking cap 440 may be removed from the cap seat adaptor 426 and a standard suitable liquid dispense out-fitting 1102 may be coupled to the luer connector portion 702 of the cap seat adaptor 426. The liquid dispense out-fitting 1102 may include a liquid-line tube 1104 connected to an out-fitting cap 1106. The liquid-line tube 1104 may be a standard liquid-line tube 1104 of any suitable size, such that the tube 1104 securely and tightly fits within an opening in the out-fitting cap 1106. The pressurizing gas inlet fitting 460 and the gas fitting plug 480 may be positioned such that they generally face outward. As is shown in FIG. 11*b*, a suitable standard gas pressure in-line 1108 may be inserted into the receiving end 802 of the pressurizing gas inlet fitting 460. To ensure that a proper connection has occurred, the line may be pressed into the gas inlet fitting 460 just past a detent that may be located in the gas inlet fitting 460. Once liquid dispense has started, a check for liquid and/or gas leaks should be preformed. If leaks are found, the liquid dispense out-fitting 1102 may be tightened further.

Once liquid dispense has been completed and/or the container 2 has been emptied, the gas pressure in-line 1108 may be removed from the pressurizing gas inlet fitting 460 to release the pressure gas in the container 2 and the gas fitting plug 480 may be recoupled to the receiving end 802 of the pressurizing gas inlet fitting 460. The liquid dispense out-fitting 1102 may be removed from the cap seat adaptor 426 and the luer locking cap 440 may be recoupled to the cap seat adaptor 426.

Figure 12:
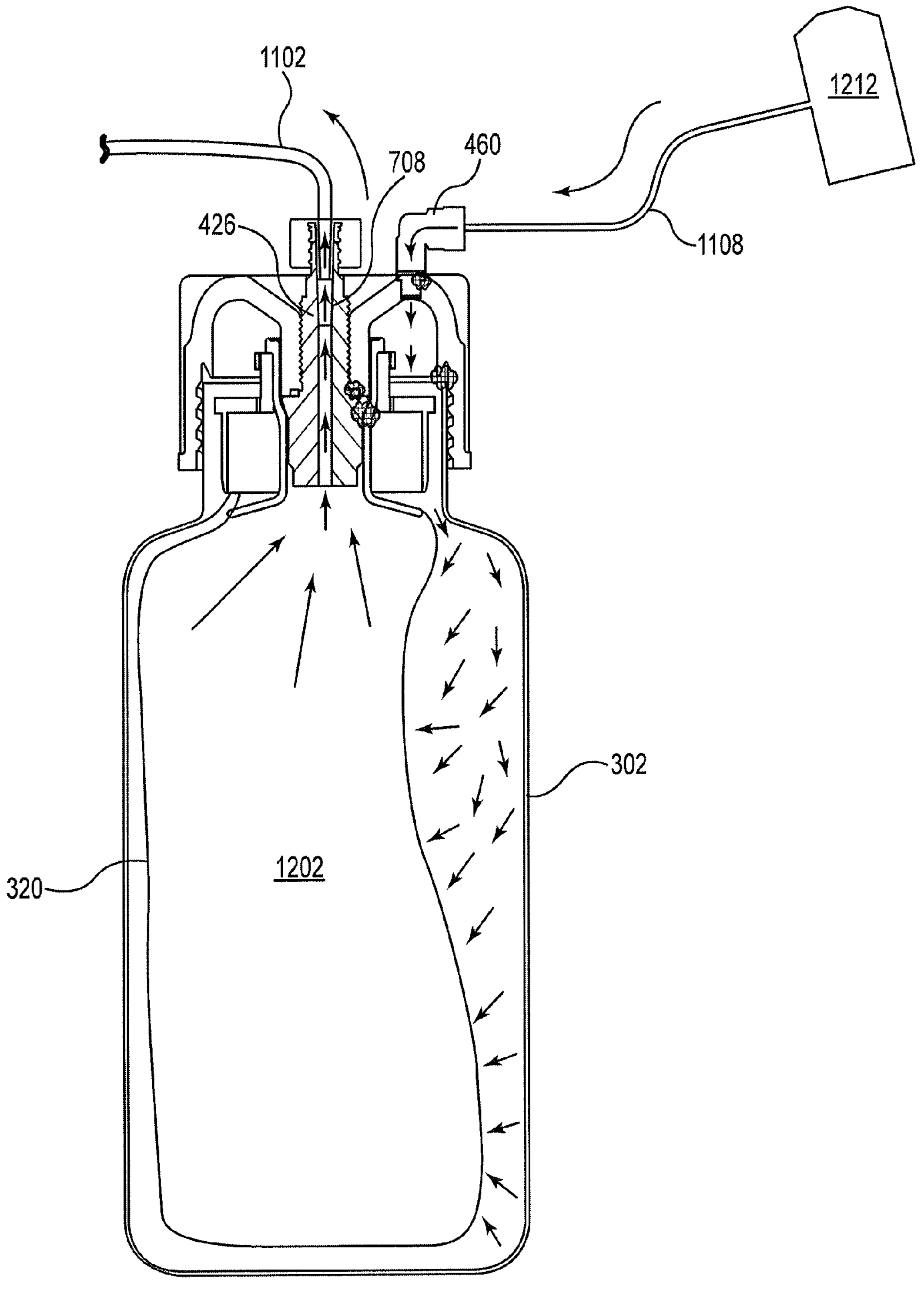
FIG. 12 is a cut-away view showing the system of the present invention during dispense, according to one embodiment of the present disclosure.

FIG. 12 generally shows how the system of the present disclosure may operate during liquid dispense, according to one embodiment. One end of a gas pressure in-line 1108 may be connected to the pressurizing gas inlet fitting 460, while the other end may be connected to a pressurized gas source 1212. One end of the liquid dispense out-fitting 1102 may be connected to the connector portion of the cap seat adaptor, while the other end may be connected to a user's end system, for example. In one embodiment, the gas source 1212 may be turned on, which will push pressurized gas into the area between the inside wall of the container 302 and the outside wall of the liner 320. As can be seen, as the amount of gas increases in the space between the wall of the container and the wall of the liner, the flexible liner will begin to collapse in upon itself, which will force the contents 1202 of the liner up through the opening 708 of the cap seat adaptor 426. Gas may continue to be added until all of the contents 1202 of the liner have been dispensed from the liner 320. As may be appreciated, as the liner 320 collapses in upon itself, it is possible that the collapsing liner could cover the hole in the base of the cap seat adaptor 426, which could preclude the remaining contents in 1202 in the liner from being dispensed. Embodiments that have the channels 760 cut into the underside of the base 706 of the cap seat adaptor 426, as shown in FIG. 7*b*, may allow the remaining contents 1202 of the liner 320 to be dispensed, as additional surface outlet area is created by the channels 760, which lead to the opening 708 of the cap seat adaptor 426.

In another embodiment, the pressurizing gas inlet fitting 460 may have nothing inserted into the receiving end 802. Rather, the receiving end 802 may be open to the air and serve as a vent, for example, during a pump-dispense application. In such an embodiment, the contents 1202 of the liner 320 may be pumped out of the liner 320 through the liquid dispense out-fitting. The liner may collapse in as liquid is dispensed out of the container.

In yet another embodiment, the cap seat adaptor embodiment shown in FIG. 7*c*, which includes dip tube 776, may be used in the system. The dip tube 776 may help avoid or prevent choke-off.

Figure 13:
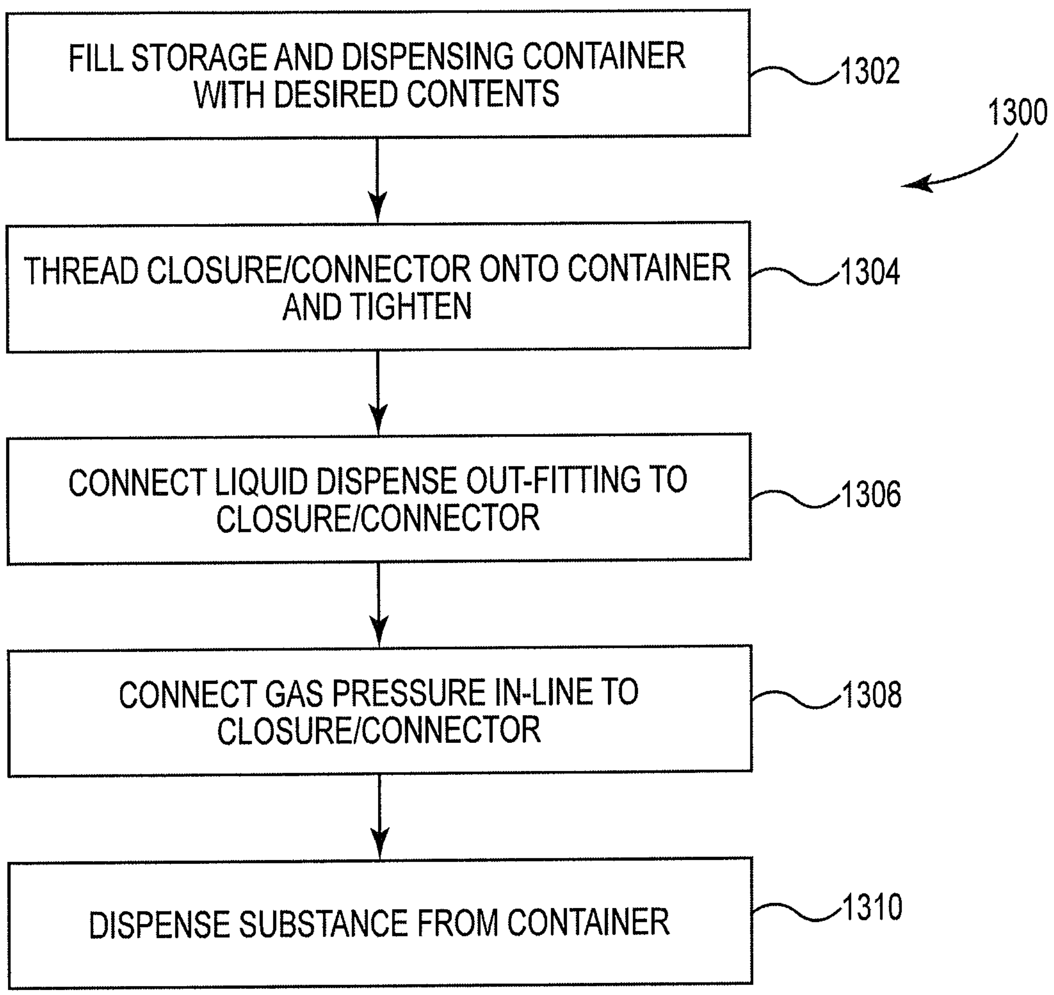
FIG. 13 is a flow diagram of a method for using a closure/connector for dispensing containers according to one embodiment of the present disclosure.

FIG. 13 illustrates the steps of a method 1300 for using the closure/connector for dispense containers according to one embodiment of the present disclosure. In a first step 1302, the storage and dispensing container may be filled with the desired contents. Once the container has been filled to the desired level, in step 1304, a closure/connector according to the present disclosure may be threaded and tightened onto the container to ensure a proper seal is formed, such that the contents of the container may not spill or leak and/or be contaminated. When the contents are ready to be discharged, in a next step 1306, a liquid dispense out-fitting may be connected to the closure/connector. In some embodiments, such as those using pressure-dispense, at step 1308, a gas pressure in-line may be connected to the closure/connector. It will be recognized, however, that in other embodiments, the contents of the container may be pump-dispensed, in which case the vent may be opened but a gas pressure in-line need not be connected to the closure/connector. In a next step 1310, the contents of the container may be dispensed, for example, using pressure-dispense or pump-dispense techniques.

In the foregoing description various embodiments of the invention have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A closure/connector assembly for use with a dispense assembly, the closure/connector comprising:
- a closure body;
- a cap seat adaptor for operable connection to the closure body, the cap seat adaptor having a proximal end and a distal end and configured for fluid communication with a source of material to be dispensed;
- a locking cap for connection to the distal end of the cap seat adaptor; and
- a pressurizing gas inlet fitting adapted for connection to a pressure source;
- wherein the closure/connector assembly is configured for the secure transport of the material to be dispensed when the locking cap is connected to the distal end of the cap seat adaptor and, in conjunction with the dispense assembly, is configured for dispense of the material to be dispensed when the locking cap is disconnected from the distal end of the cap seat adaptor.

2. The closure/connector assembly of claim 1, wherein the closure body is made of polypropylene.

3. The closure/connector assembly of claim 1, further configured for a disposable, one-time use.

4. The closure/connector assembly of claim 1, wherein the cap seat adaptor further comprises a feature for reducing choke-off.

5. The closure/connector assembly of claim 4, wherein the feature for reducing choke-off comprises at least one channel positioned at the proximal end of the cap seat adaptor.

6. The closure/connector assembly of claim 3, wherein the closure/connector is configured for pressure dispensing the material to be dispensed.

7. The closure/connector assembly of claim 3, wherein the closure/connector is configured for pump dispensing the material to be dispensed.

8. The closure/connector assembly of claim 7, wherein the cap seat adaptor further comprises a dip tube extending into an interior of the dispense assembly.

9. The closure/connector assembly of claim 7, wherein the pressurizing gas inlet fitting is configured for utilization as a vent during dispense.

10. A dispense assembly, comprising:
- a liner for holding a material to be dispensed;
- an overpack having the liner disposed therein;
- a closure/connector assembly secured to the liner and overpack, the closure/connector comprising:
  - a closure body;
  - a cap seat adaptor for operable connection to the closure body, the cap seat adaptor having a proximal end and a distal end and configured for fluid communication with a source of material to be dispensed;
  - a locking cap for connection to the distal end of the cap seat adaptor; and
  - a pressurizing gas inlet fitting adapted for connection to a pressure source;
  - wherein the closure/connector assembly is configured for the secure transport of the material to be dispensed when the locking cap is connected to the distal end of the cap seat adaptor and, in conjunction with the liner and overpack, is configured for dispense of the material to be dispensed when the locking cap is disconnected from the distal end of the cap seat adaptor.

11. The dispense assembly of claim 10, wherein the closure/connector is configured for pressure dispensing the material to be dispensed.

12. The dispense assembly of claim 11, wherein the cap seat adaptor comprises at least one channel positioned at the proximal end of the cap seat adaptor.

13. The dispense assembly of claim 10, wherein the closure/connector is configured for pump dispensing the material to be dispensed.

14. The dispense assembly of claim 13, wherein the cap seat adaptor further comprises a dip tube extending into an interior of the liner and in fluid communication with the material to be dispensed.

15. The dispense assembly of claim 10, further comprising a shipping ring detachably coupled to the dispense assembly to protect the closure/connector assembly during at least one of storage or transport.

16. The dispense assembly of claim 10, further comprising a shipping container for positioning the liner and overpack there within.

17. A method for storing, shipping, and dispensing the contents of a dispense assembly, the method comprising:

securing a closure/connector to the dispense assembly, the closure/connector comprising:

a closure body;

a cap seat adaptor for operable connection to the closure body, the cap seat adaptor having a proximal end and a distal end and configured for fluid communication with a source of material to be dispensed;

a locking cap for connection to the distal end of the cap seat adaptor; and a pressurizing gas inlet fitting adapted for connection to a pressure source;

wherein the closure/connector assembly is configured for the secure transport of the material to be dispensed when the locking cap is connected to the distal end of the cap seat adaptor and, in conjunction with the dispense assembly, is configured for dispense of the material to be dispensed, such that the material to be dispensed is dispensable by removing the cap and connecting a liquid dispense outfitting to the distal end of the cap seat adaptor.

18. The method of claim 17, wherein the closure/connector is configured for pressure dispensing the material to be dispensed.

19. The method of claim 18, wherein the closure/connector assembly is further configured for connecting a pressure in-line to the pressurizing gas inlet fitting prior to pressure dispense.

20. The method of claim 17, wherein the closure/connector is configured for pump dispensing the material to be dispensed.

* * * * *

UNITED STATES PATENT AND TRADEMARK OFFICE

CERTIFICATE OF CORRECTION

PATENT NO. : 8,733,598 B2
APPLICATION NO. : 12/982160
DATED : May 27, 2014
INVENTOR(S) : Nelson et al.

It is certified that error appears in the above-identified patent and that said Letters Patent is hereby corrected as shown below:

On Title Page, Column 2, Item (74), under "*Attorney, Agent, or Firm*", delete "Winthop & Weinstine, P.A." and insert -- Winthrop & Weinstine, P.A. --, therefor.

Signed and Sealed this
Seventeenth Day of November, 2015

Michelle K. Lee
*Director of the United States Patent and Trademark Office*